United States Patent
Adar et al.

(10) Patent No.: US 7,246,121 B2
(45) Date of Patent: Jul. 17, 2007

(54) SYSTEM AND METHOD FOR MODIFYING NEW MESSAGE RETRANSMISSION WITHIN A SYSTEM FOR HARVESTING COMMUNITY KNOWLEDGE

(75) Inventors: Eytan Adar, Palo Alto, CA (US); Rajan Mathew Lukose, Palo Alto, CA (US); Joshua Rogers Tyler, Stanford, CA (US); Caesar Sengupta, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 582 days.

(21) Appl. No.: 10/262,717

(22) Filed: Oct. 2, 2002

(65) Prior Publication Data

US 2004/0068499 A1    Apr. 8, 2004

(51) Int. Cl.
*G06F 7/00* (2006.01)
*G06F 17/30* (2006.01)
*G06F 15/16* (2006.01)

(52) U.S. Cl. ............ 707/9; 707/3; 707/7; 709/203; 709/206

(58) Field of Classification Search .......... 707/2, 707/9, 3, 7; 709/203, 206–232
See application file for complete search history.

(56) References Cited

U.S. PATENT DOCUMENTS

| | | | |
|---|---|---|---|
| 5,689,708 A * | 11/1997 | Regnier et al. ......... 709/229 |
| 5,729,682 A * | 3/1998 | Marquis et al. ......... 709/229 |
| 5,754,939 A * | 5/1998 | Herz et al. ............ 455/3.04 |
| 6,076,101 A * | 6/2000 | Kamakura et al. ....... 709/206 |
| 6,119,114 A * | 9/2000 | Smadja .................. 707/7 |
| 6,154,783 A * | 11/2000 | Gilmour et al. ......... 709/245 |
| 6,230,269 B1 | 5/2001 | Spies et al. |
| 6,578,025 B1 * | 6/2003 | Pollack et al. ............ 707/2 |
| 6,826,619 B1 * | 11/2004 | Khare et al. ............ 709/232 |
| 2004/0001476 A1 * | 1/2004 | Islam et al. ............ 370/352 |

OTHER PUBLICATIONS

Rose et al, 'MessageWorld: A New Approach to Facilitating Asynchronous Group Communiation', Dec. 1995, ACM Press, pp. 266-273.*

Pending Patent Application entitled: "System and Method for Harvesting Community Knowledge" U.S. Appl. No. 10/093,658, filed Mar. 7, 2002, Inventors: Eytan Adar et al.

Pending Patent Application entitled: "System and Method for Profiling Clients Within a System for Harvesting Community Knowledge" U.S. Appl. No. 10/106,096, filed Mar. 25, 2002, Inventors: Eytan Adar et al.

Adriana Vivacqua & Henry Lieberman—"Agents to Assist in Finding Help"—2000—pp. 65-72.

(Continued)

*Primary Examiner*—Don Wong
*Assistant Examiner*—Cheryl M Shechtman (57) ABSTRACT

A system and method is disclosed for knowledge management. The method discloses the elements of: generating a client profile on a client computer connected to a network; storing the profile on the computer; receiving a new message; scoring the new message with respect to the client profile; counting a number of message responses to the new message; and re-transmitting the new message to a first sub-set of client computers on the network, based on the response count. The system discloses means for implementing the method.

30 Claims, 7 Drawing Sheets

OTHER PUBLICATIONS

Webpage—Gnutella. "http://gnutella.wego.com/"—a widely known peer-to-peer network.

Webpage—Freenet "http://freenet.sourceforge.net/"—peer-to-peer architecture for file sharing.

Mark S. Ackerman & David W. McDonald—"Answer Garden 2: Merging Organizational Memory With Collaborative Help"—1996—pp. 97-105.

David W. McDonald & Mark S. Ackerman—"Expertise Recommender: A Flexible Recommendation System and Architecture"—Dec. 2000—pp. 231-240.

Leonard N. Foner—"Yenta" A Multi-Agent, Referral-Based Matchmaking System—1997—pp. 301-307.

Nathaniel S. Borenstein—"Computational Mail as Network Infrastructure for Computer-Supported Cooperative Work"—Nov. 1992—pp. 67-74.

Michael K. Reiter and Aviel D. Rubin—"Crowds: Anonymity for Web Transaction"—pp. 1-23.

Dawit Yiman-Seid & Alfred Kobsa—"Expert-Finding Systems for Organizations: Problems and Domain Analysis and the DEMOIR Approach"—pp. 1-23.

Expert-finding systems (such as www.exp.com, www.keen.com)—enable individuals to find experts to answer questions.

Clarke et al. "Freenet A Distributed Anonymous Information Storage and Retrieval System," Proc. Design. Privacy Enhancing Tech. Int. Wkshp. Berlin Jul. 1, 2000, 1-17.

* cited by examiner

SYSTEM AND METHOD FOR MODIFYING NEW MESSAGE RETRANSMISSION WITHIN A SYSTEM FOR HARVESTING COMMUNITY KNOWLEDGE

CROSS-REFERENCE TO CO-PENDING APPLICATIONS

This application relates to and incorporates by reference co-pending U.S. patent applications: Ser. No. 10/093,658, entitled "System And Method For Harvesting Community Knowledge," filed on Mar. 7, 2002, by Adar et. al. This application is assigned to Hewlett-Packard Co. of Palo Alto, Calif.

BACKGROUND OF THE INVENTION

1. Field of the Invention

The present invention relates generally to systems and methods for information sharing and knowledge management, and more particularly for scoring new messages based on previous responses within a system for harvesting community knowledge.

2. Discussion of Background Art

Satisfying information needs in a diverse, heterogeneous information environment is challenging. In order to even begin the process of finding information resources or answers to questions, individuals typically must know either where to look, or whom to ask. This is often a daunting task, especially in large enterprises where many of the members will not know each other, nor be aware of all the information resources potentially at their disposal. In such situation, individuals often present their questions and messages in a somewhat haphazard manner to others who may or may not be able to answer them. When the wrong person is asked the question, or presented with the message, that person's valuable time is wasted. This is equivalent to receiving "spam" in an electronic mail system.

Current systems for storing information and/or organizational expertise include Knowledge Databases (K-bases), such as document repositories and corporate directories, and Knowledge Management systems, which rely on users to explicitly describe their personal information, knowledge, and expertise to a centralized K-base.

Figure 1:
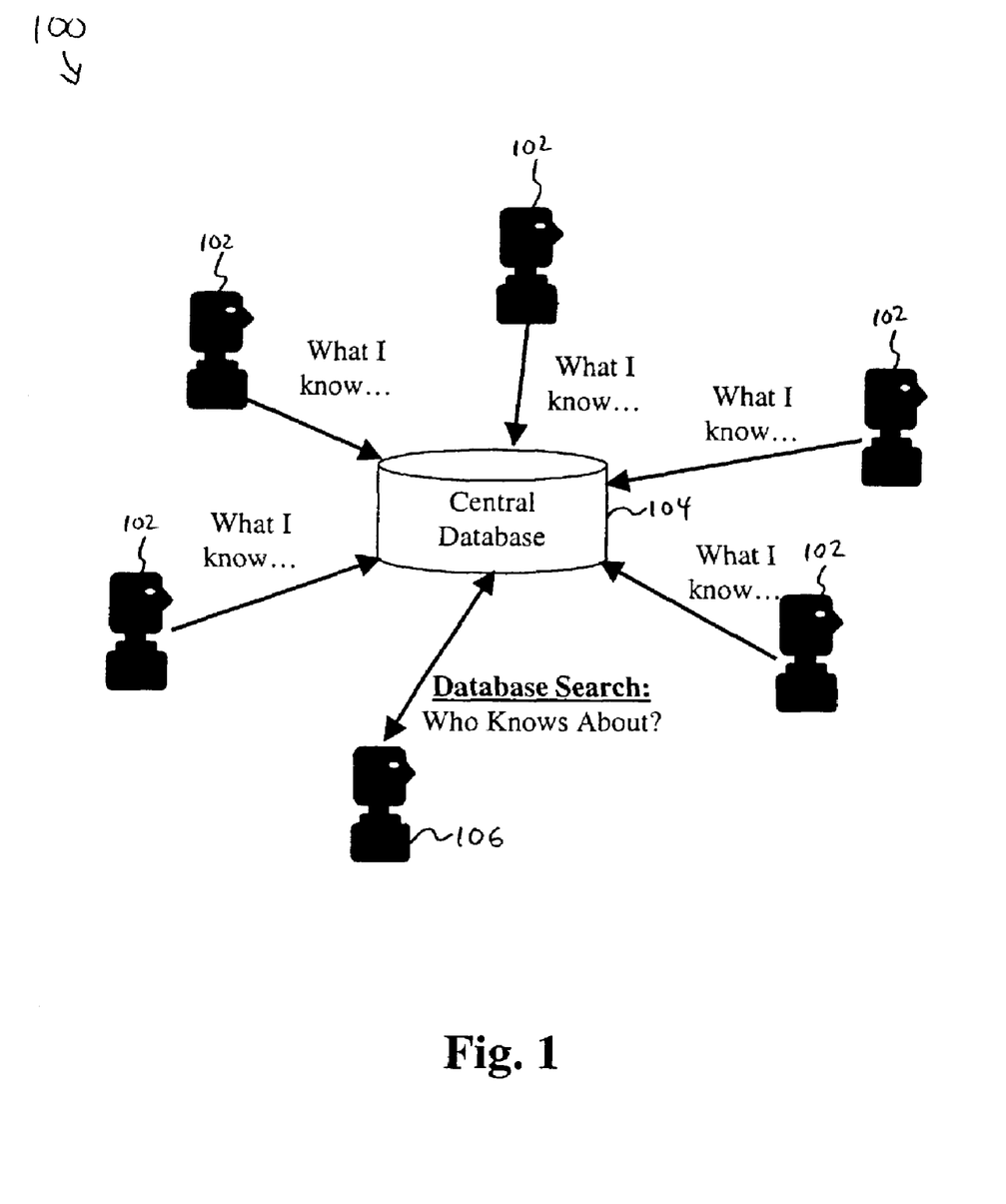
FIG. 1 is a dataflow diagram of a conventional system for knowledge management.

FIG. 1 is a dataflow diagram of a conventional knowledge management system 100. In a typical architecture, information providing users 102 explicitly decide what descriptive information they provide to a central database 104. An information seeking user 106 then performs a query on the central database 104 in order to find an information provider who perhaps may be able to answer the seeker's question.

There are several significant problems with such systems. First, knowledge management systems, like that shown in FIG. 1, require that information providers spend a significant amount of time and effort entering and updating their personal information on the central database 104. For this reasons alone, such systems tend to have very low participation rates. In addition, even those information providers, who take time to enter and update this information, may misrepresent their personal information or level of knowledge and expertise be it willfully or not. Furthermore, they may neglect or be unable to reveal much of their tacit knowledge within their personal description. Tacit knowledge is knowledge a user possesses, but which the user either does not consider important enough to enter, or which they may not even be consciously aware that they know.

Another problem is an information provider's lack of privacy with respect to their personal information stored on the central database 104. As a result, information providers may be unwilling to reveal much about themselves in the presence of a risk that their privacy would be violated. The resulting high participation costs often results in profiles that are stale and lack richness. Another problem with such systems, is their lack of anonymity. Information seekers and providers cannot remain anonymous while performing queries or asking questions. As such, they may not perform a search, as a question, or wholeheartedly reveal their knowledge about a particular topic in their response to another user's question.

In response to the concerns discussed above, what is needed is a system and method for harvesting community knowledge that overcomes the problems of the prior art.

SUMMARY OF THE INVENTION

The present invention is a privacy-preserving system and method for knowledge management. A first embodiment of the method of the present invention includes the elements of: generating a client profile on a client computer connected to a network; storing the profile on the computer; receiving a new message; scoring the new message with respect to the client profile; counting a number of message responses to the new message; and re-transmitting the new message to a first sub-set of client computers on the network, based on the response count.

A second embodiment of the present invention also includes the elements of: waiting for a predetermined time period; retrieving an actual response count after the first predetermined time period; and re-transmitting the new message to a second sub-set of client computers on the network, if the actual response count remains less than a predetermined minimum response count.

A third embodiment of the present invention also includes the element of: configuring the client computer as a server computer on the network.

The system of the present invention, includes all means for implementing the method. These and other aspects of the invention will be recognized by those skilled in the art upon review of the detailed description, drawings, and claims set forth below.

DETAILED DESCRIPTION OF THE PREFERRED EMBODIMENT

Figure 2:
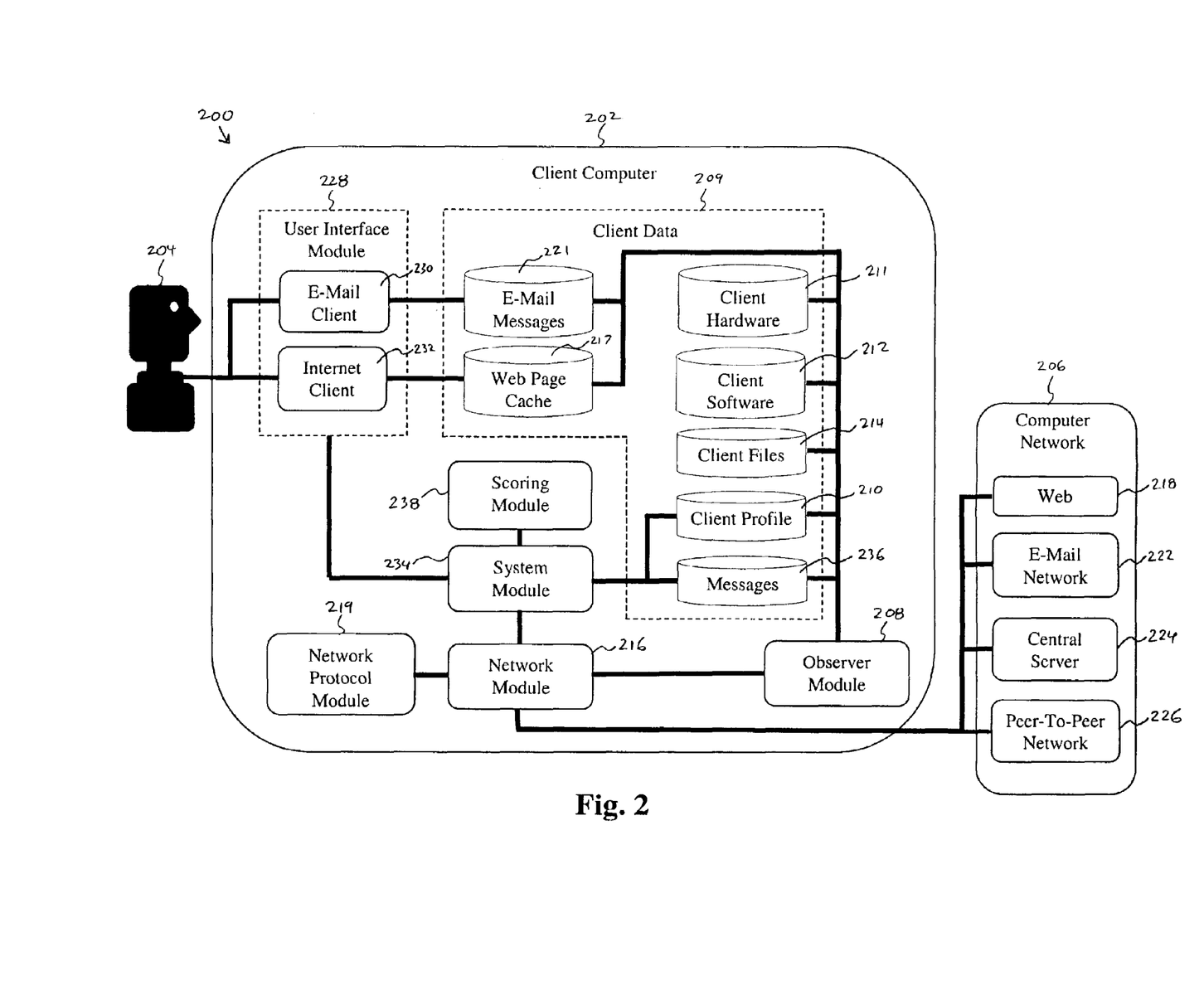
FIG. 2 is a dataflow diagram of one embodiment of a system for profiling clients within a system for harvesting community knowledge.
Figure 3:
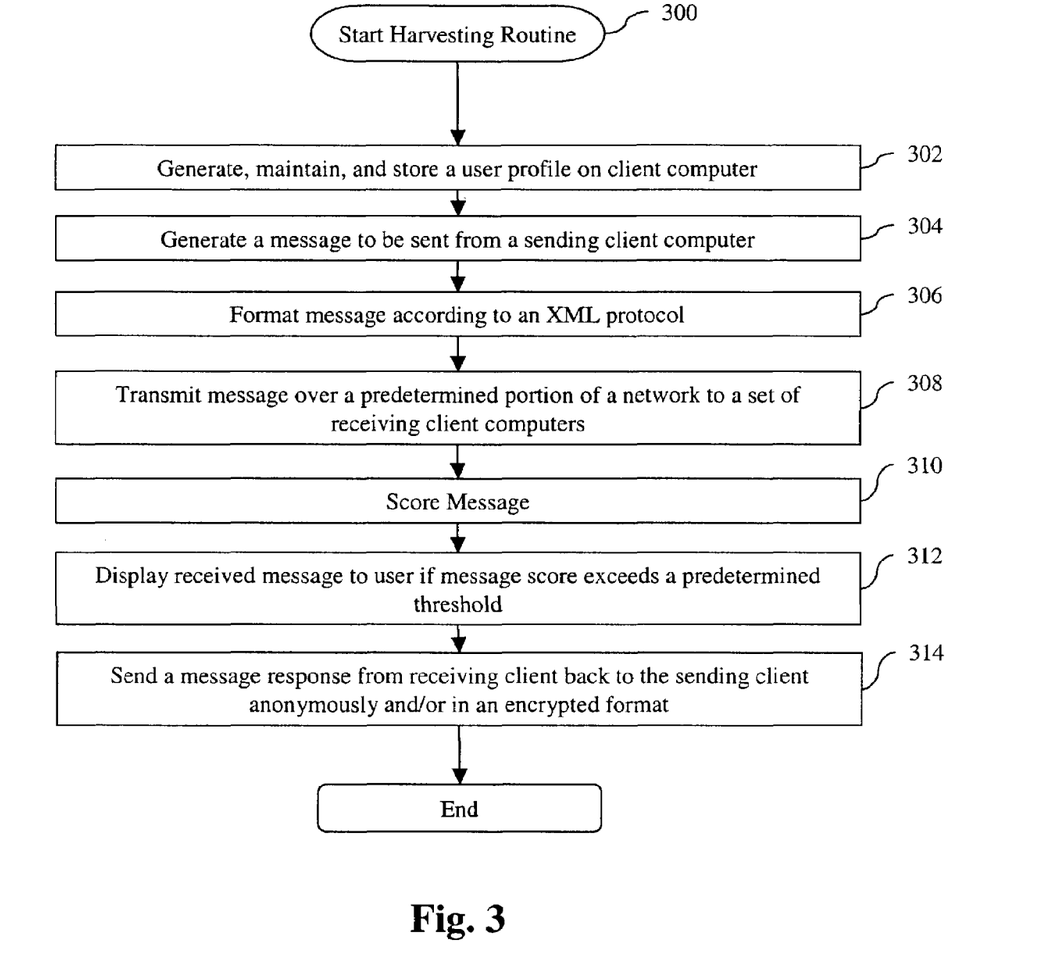
FIG. 3 is a flowchart of one embodiment of a method for harvesting community knowledge.

FIG. 2 is a dataflow diagram of one embodiment of a system 200 for harvesting community knowledge. FIG. 3 is a flowchart of one embodiment of a method 300 for harvesting community knowledge. FIGS. 2 and 3 are herein discussed together. The system 200 includes a client computer 202 under the control of a client user 204, and connected to a computer network 206. The client 202 both sends and receives messages respectively to and from other client computers and information sources via the network 206. When a client computer generates and sends a message such client computer is herein alternately called a sending client, and when a client computer receives a message, such client computer is herein alternately called a receiving client. Preferably all client computers on the network include the same functionality, which is now described with respect to the client computer 202, however some receiving clients may not currently have the present invention's software installed.

While the present invention is now discussed primarily with reference to only the client computer 202, one or more servers, or client computers designated as servers, including functionality equivalent or similar to the client computer 202, may also be added to the network 226. Multiple servers can provide for fault tolerance within the network 206 as well as geographic diversity, for increased network performance. Similarly, one or more client computers, such as those client computers having a greatest processing power or storage capability, can be nominated to function as network servers. In the case where there are multiple servers on the network 206, servers will preferably mirror each other in order to provide such fault tolerance. Clients attempting to post messages to an overloaded server, however, will be referred to another, less utilized server. The location of all servers on the network 206 is preferably globally known to all of the client computers.

User Profiling

User profiling by the present invention, enables the system 200 to capture historical information about the client user 204, as well as real-time information as the client user 204 goes about their daily digital business. This knowledge is expressed indirectly in the client user's 204 behavior and data stored on the client computer 202 and from the client user 204 and client computer 202 interactions with the network 206.

The present invention uses an observer module 208 to automatically compile and store client user profile information in a client profile 210. The client profile 210 is generated using systematic, objective and repeatable methods which can be adjusted and modified to suit any number of client user environments and/or information processing end goals. Since the client profile 210 is automatically created, the client user 204 is relieved from the arduous task of having to manually build their own profile. This dramatically reduces participation costs for all client users of the present invention, while ensuring that the client user's profile is constantly kept up to date.

Preferably, more than one data source or set of data items are profiled in order to generate a multi-dimensional understanding of the client user's 204 knowledge and that the resultant client user profile is of a high quality. This is because singular sources of data, such as e-mail, tend not to fully reflect a client user's interests and expertise. Also, since client user profiles are preferably generated on each client user's own computer 202, no new hardware resources need be purchased in order to implement the present invention.

The method 300 begins in step 302 with the observer module 208 generating and maintaining the client profile 210 on the client computer 202. Profiling begins with the observer module 208 accessing a predetermined set of data targets for building the client profile 210. The set of data targets are preferably selected to provide a robust source of data for processing into a meaningful and versatile client profile 210. The data targets include information stored on the client computer 202, information accessible over the network 206, as well as behavioral data which can be obtained by monitoring the client user's 204 activities on the computer 202 and over the network 206.

The observer 208 then analyzes the collected and retrieved information using data mining techniques. Structured data items within the collected and/or retrieved information, such as e-mail addresses or URLs, are stored in dedicated fields within the client profile 210. Unstructured data items within the collected and retrieved information, such as pure text, however are first statistically analyzed. The statistical analysis includes, first identifying a set of keywords and a set of key phrases within the unstructured data items and then, calculating a frequency of occurrence for each keyword and key phrase within the data item. The keywords, key phrases, and their respective calculated frequencies of occurrence are then stored in the client profile 210. If the keyword or key phrase already exists within the client profile 210, their frequencies of occurrence are combined. Preferably, the unstructured data itself is not stored within the client profile 210. The client profile 210 data structure is preferably that of a relational database upon which queries can be easily performed.

Thus the present invention's observer 208, by collecting, retrieving, and analyzing, information from the data targets, effectively captures the client user's 204 tacit knowledge, which the client user 204 themselves may not even be conscious of having knowledge, expertise, or an interest in.

In order to maximize the client user's 204 privacy and thereby encourage broad client user participation within the information market, the client profile 210 is preferably stored only on the client computer 202, however the profile 210 may also be stored remotely either in encrypted or password protected form and viewable only by the client user 204. Also to toward this goal, the client user 204 is also preferably given an option of erasing their client profile 210, or having the observer 208 rebuild a new client profile for the client user 204. A high degree of client user privacy encourages client users to permit the system 200 to build very rich client user profiles which go far beyond those client users would otherwise voluntarily disclose to a central database.

Figure 4:
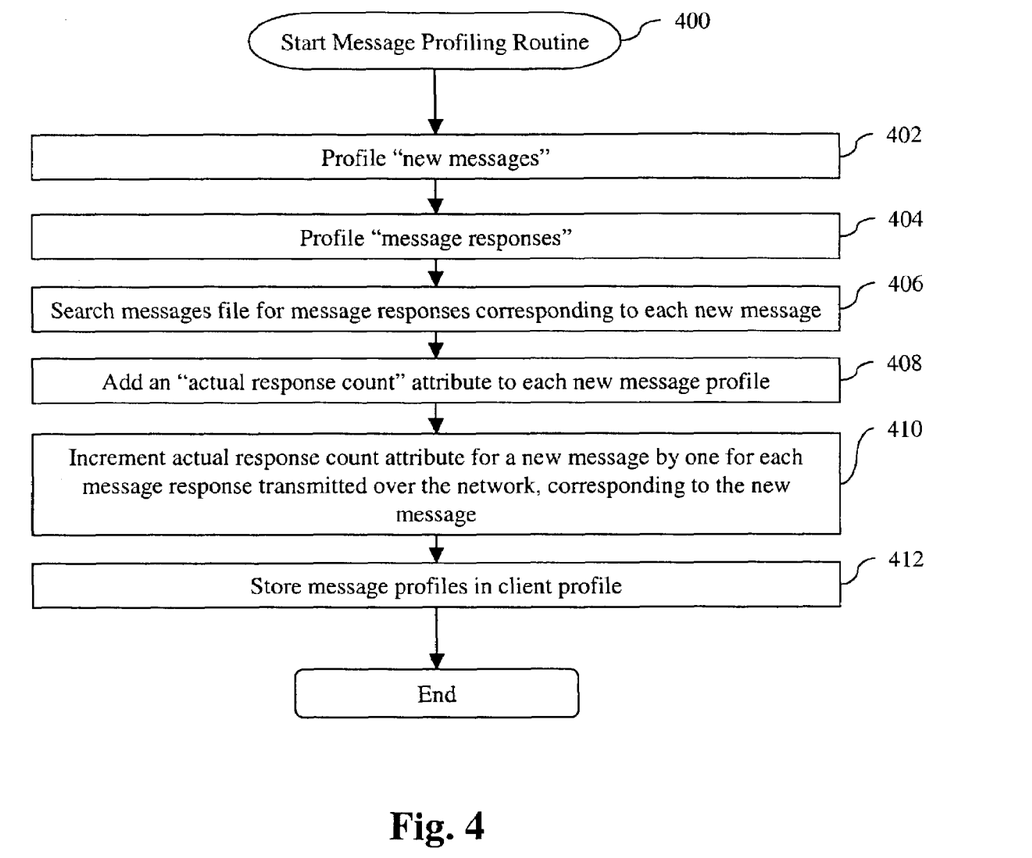
FIG. 4 is a flowchart of one embodiment of a method for adding message response information to a client or network profile.

While a general description of the client profile 210 has just been presented, client profiles 210 can vary in their particular implementation. FIG. 4 describes an implementation of the client profile 210 which monitors responses to messages sent over the network 206.

FIG. 4 is a flowchart of one embodiment of a method 400 for adding message response information to the client profile 210 on the client computer 202, and/or to a network profile on a server computer connected to the network 206. Messages traverse the network 206 (especially the peer-to-peer network 226), in the following manner. First an original message is generated by one of the client computers 202 (a.k.a. the sending client computer). This original message is received by other client computers (a.k.a. the receiving client computers) on the network 206. Some of these receiving client computers may generate responses to the original message. Those "responses" are then received by all the receiving client computers, which now includes, by definition, the sending client computer. Subsequent message responses are thus generated in response to previous message responses, creating what is well known as a message "thread." In order to simplify discussion of the present invention's discussion, in light of these point of reference changes, the following definitions are presented. Those skilled in the art will recognize that other embodiment of the present invention may use semantically different definitions, which nevertheless have the same functionality discussed below.

Thus, a "new message" is herein defined as any message received by a client computer, which the client computer 202 has neither "answered/responded to" nor "deleted." In a first embodiment of the present invention a "new message" may be identified as having a first text string in a subject line of the message.

A "message response" is herein defined, as a message either "received" or "generated" by a client computer which corresponds to a previously sent new message. In the first embodiment of the present invention a "message response" may be identified as having a second text string in a subject line, which includes the first text string preceded by the string "RE:" and which is commonly known in e-mails messages to indicate a response. An important conceptual clarification, regarding the "new message" and "message response" distinction, is that "received message responses" are also themselves "new messages," while "generated message responses" are not.

Also, for the purposes of this patent application the terms "message response" and an "message answer" are synonymous. In addition, messages which have been "answered" and then subsequently "deleted," are still defined as a "messages answered."

Note that use of the subject line in a message in order to distinguish new messages from message responses are only for the one embodiment of the present invention. Those skilled in the art will recognize and that there are many other ways of distinguishing "new messages" from "message responses" other than by looking at text strings in the subject line of a message.

The method begins in step 402 where the observer module 208 profiles the client computer's 202 "new messages." As discussed above, profiling typically involves generating expertise vectors for a message by extracting various structured data items from the message as well as analyzing various unstructured data items within the message. Next begins in step 404 the observer module 208 profiles the client computer's 202 "message responses" in a manner similar to how new messages are profiled. Note that after message responses have been profiled, they may or may not be deleted from the messages file 236 in order to conserve memory resources on the client computer 202.

Then, in step 406, the observer module 208 searches the messages file 236 for message responses corresponding to each new message. For example, in embodiments which distinguish message responses from new messages by reviewing a message subject line, a message response is identified as a message having an identical subject line to a new message, except that a text string "RE:" precedes the new message's subject line. Next, in step 408, the observer module 208 adds an "actual response count" attribute to each of the new message profiles. Then, in step 410 the observer module 208 increments the actual response count attribute for a new message by one for each message response transmitted over the network, corresponding to the new message. In step 412, all message profiles are stored in the client profile 210.

Message Generation

Next to be described is a system and method for generating messages in step 304 using the present invention. Messages are herein defined to include a wide variety of communications known to those skilled in the art, including any communication seeking, sending, and/or culling information from an information market. Thus messages can include questions, announcements, and/or information processing routines. First, the client user 204 accesses a client user interface module 228.

The client user interface module 228 preferably includes a set of software modules for interfacing with the client user 204. Such modules at a minimum include the e-mail client 230, which stores a predetermined set of e-mail messages 221, and the Internet client 232, which stores information in the web page cache 217. These two modules 230 and 232 provide the client user 204 with alternate ways of using the present invention and preferably, both contain similar functionality, such as text windows and folders for storing messages both sent and received.

Through the client user interface module 228, the client user 204 initiates the message generating process, such as by clicking on an "Ask a Question" button in a toolbar within the client user interface. In response, the client user interface module 228 displays a number of pre-defined message types to the client user 204.

After a message has been generated it is preferably assigned a globally unique identifier and stored in a messages database 236. The network module 216 periodically scans the message database 236 for new messages generated by the client user 204. Then in step 306, a network protocol module 219 formats the new message according to an XML (Extensible Markup Language) protocol for transmission by the network module 216 over the network 206. Both a client computer sending the message and a client computer receiving the message must be apprised of the particular XML protocol used to format the message, in order for communication to occur.

Message Transmission

Next in step 308, the network module 216 transmits the message over a predetermined portion of the computer network 206. As mentioned above, when the computer client 202 transmits a message over the network 206 it is called a sending client, while when the computer client 202 receives a message over the network 206 it is called a receiving client. Thus in normal operation, all client computers function as both sending and receiving clients.

While messages transmitted over the peer-to-peer network 226 achieve a high level of anonymity, many messages will likely be transmitted over the e-mail network 222 or displayed on a web 218 site in order to advertise the present invention and thereby build-up the peer-to-peer network 226.

However, regardless of over which network portion the message is sent, each receiving client having the present invention installed stores a copy of the XML encoded message in their respective messages database.

Modified Message Transmission

Since each of the client profiles 210 are preferably stored only on their respective client computers 202, client computers 202 on the network 206 are unable to determine how much expertise client users connected to the network 206 have. As a result, some new messages globally broadcast over the network 206 and which score highly with many other client users, may result in a large number of redundant message responses, while other broadcast messages may yield few if any responses and then only after a long waiting period as the message propagates through all the client users on the network. Such a waiting period could be particularly long on peer-to-peer networks as the message propagates from peer to peer.

For example, a new message, such as "How is Java compiling performed?" globally broadcast over a network, which includes a group of Java engineers, would likely result in a large number of message responses, all containing very similar and redundant material. This not only unnecessary loads the network 206 with message traffic, but also wastes the resources of far more Java engineers than is necessary to respond to the new message. One solution to the above problem is to regulate re-broadcasting of new messages over the network 206 based on a number of message responses to the new message observed on the network 206.

Figure 5:
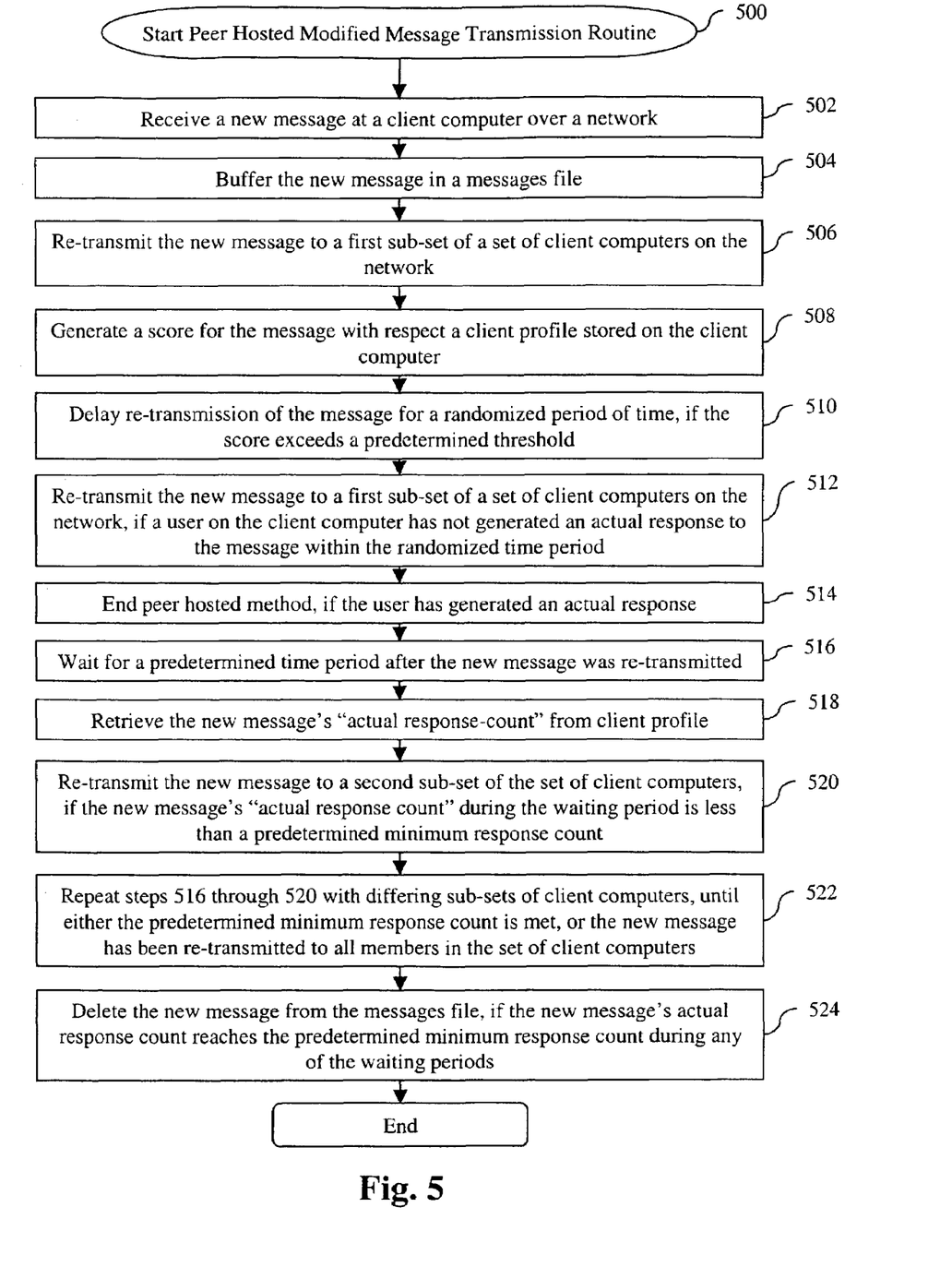
FIG. 5 is a flowchart of a peer-hosted method for modifying new message transmission based on actual message responses.

FIG. 5 is a flowchart of a peer-hosted method 500 for modifying "new message" transmission based on "actual message responses," which addresses the above concerns. The method 500 begins in step 502 where the client computer 202 receives a new message over the network 206, having a set of client computers. Next in step 504, the system module 234 buffers the new message in the messages file 236.

In step 506, the network module 216 re-transmits the new message to a first sub-set of the set of client computers on the network 206.

In an alternate embodiment, step 506 is replaced with steps 508 through 514. In step 508, the client computer which receives the message generates a score for the message with respect a client profile stored on that client computer. The score is generated according to step 310 in FIG. 3, discussed below. In step 510, if the score exceeds a predetermined threshold, the client computer 202 does not retransmit the message for a randomized period of time. During the time period, the user on that client computer may generate an actual response to the message. Next, in step 512, if a user on the client computer has not generated an actual response to the message within the randomized time period, the client computer re-transmits the new message to the first sub-set of the set of client computers on the network 206. However, in step 514, if the user has generated an actual response, the method 500 ends on the client computer 202. Note that in the peer-hosted mode, even though the client computer 202 is no longer re-transmitting the message, other client computers which have received the message may continue re-transmitting the message.

In step 516, if the client computer 202 has re-transmitted the message, the system module 234 waits for a predetermined time period after the "new message" was re-transmitted by the network module 216. This calculation is performed by comparing a time-tag associated with the new message re-transmission to current system time on the client computer 202.

In step 518, the system module 234 then retrieves the new message's "actual response count" from the client profile 210. In step 520, the network module 216 re-transmits the new message to a second sub-set of the set of client computers on the network 206, if the new message's "actual response count" after expiration of the waiting period is less than a predetermined minimum actual response count. In this way, new messages which are not generating a sufficient number of message responses are preferably re-transmitted to more client computers on the network 206, increasing a likelihood that the new message will yield a greater number of message responses. Preferably the second sub-set is greater than and does not overlap the first sub-set, however, how much greater the second sub-set is from the first sub-set can be based on any mathematical function (e.g. linear, exponential, etc.)

In step 522, steps 516 through 520 are repeated with differing sub-sets of client computers, until either the predetermined minimum actual response count is met, or the new message has been re-transmitted to all members in the set of client computers on the network 206, after which the method 500 ends.

In step 524, if the new message's "actual response count" reaches the predetermined minimum actual response count or exceeds the predetermined minimum response count by a predetermined sufficient amount, after expiration of any of the waiting periods, the system module 234 deletes the new message from the messages file 236 and re-transmission of that new message ends. In this way, new messages which generate the sufficient amount of message responses are no longer re-transmitted over the network 206, conserving network resources as well as both sending and receiving client user's limited time.

Figure 6:
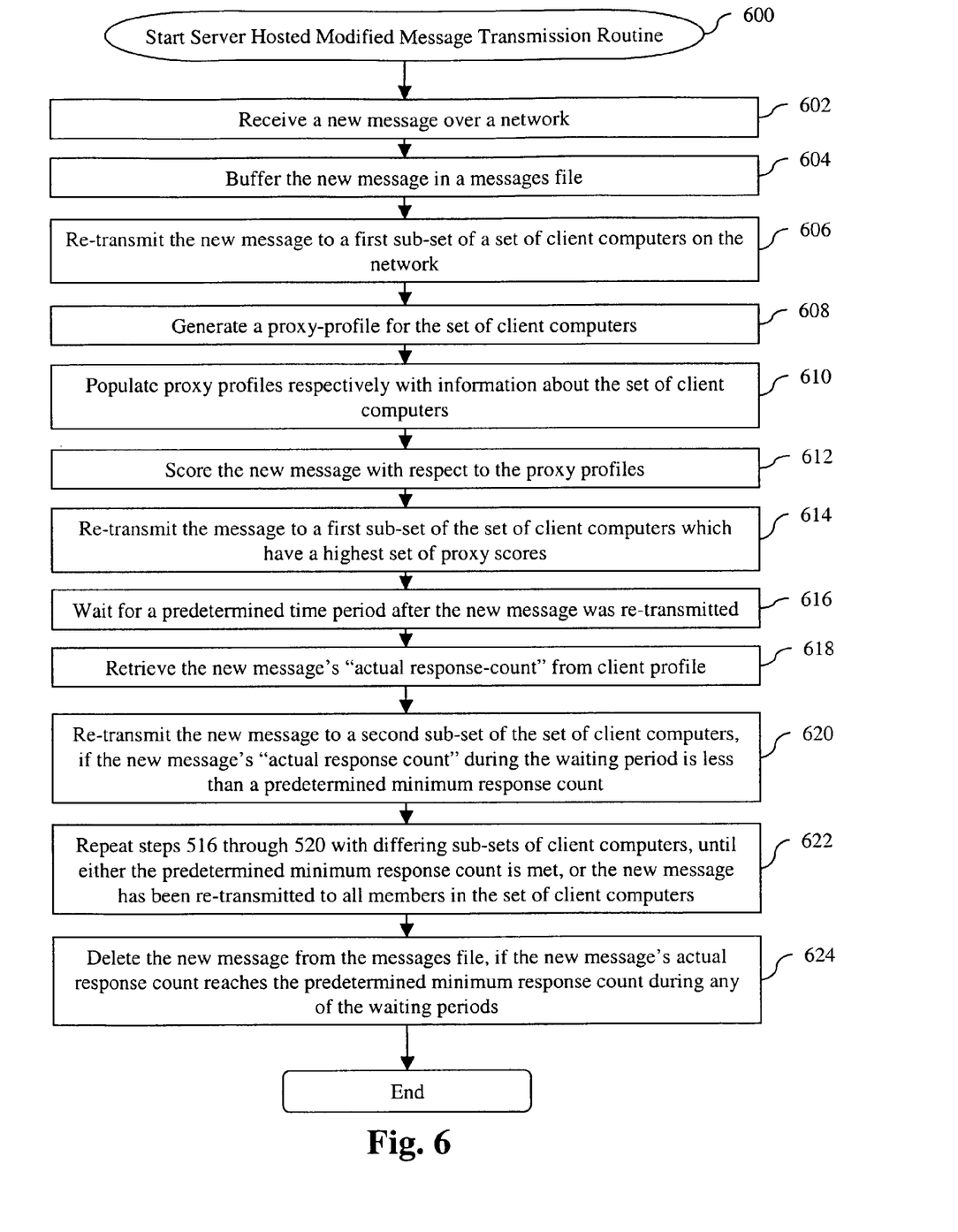
FIG. 6 is a flowchart of a server-hosted method for modifying new message transmission based on actual message responses.

FIG. 6 is a flowchart of a server-hosted method 600 for modifying "new message" transmission based on "actual message responses." The method 600 begins in step 602 where a network server computer receives a new message over the network 206, having a set of client computers. Note that the network server can be either the central server 224 or a client computer which has sufficient processing and memory capacity. In order to minimize network message traffic, the sending client computer preferably sends only one copy of the new message either directly or anonymously to the network server computer.

Next in step 604, the system module 234 buffers the new message in the messages file 236. In step 606, the network module 216 re-transmits the new message to a first sub-set of the set of client computers on the network 206, selected from a record of all client computers on the network 206, which the network server computer preferably stores and maintains. The network server computer preferably controls re-transmission of the new messages by selectively permitting the client computers to pick-up the new message from the network server computer. In alternate embodiments however, the network server computer can control re-transmission of the new messages by selectively re-transmitting the new messages to the client computers on the network 206. Both approaches substantially reduce message traffic on the network.

In an alternate embodiment, step 606 is replaced with steps 608 through 614. In step 608, the network server computer generates a proxy-profile for the set of client computers, which the network server computer has information on. In step 610, the proxy profiles are respectively populated with information about the set of client computers which the network server computer is aware of. Such proxy-profiles however will not be as "rich" as the client profiles 210 stored on individual client computers 202. In step 612, the network server computer scores the new message with respect to the proxy profiles. Then, in step 614, the network server computer re-transmits the message to a first sub-set of the client computers having a highest set of proxy scores.

In step 616, the system module 234 waits for a predetermined time period after the "new message" was re-transmitted by the network module 216. This calculation is performed by comparing a time-tag associated with the new message re-transmission to current system time on the network server computer.

In step 618, the system module 234 then retrieves the new message's "actual response count" from the client profile 210. In step 620, the network module 216 re-transmits the new message to a second sub-set of the set of client computers on the network 206, if the new message's "actual response count" after expiration of the waiting period is less than a predetermined minimum actual response count. In this way, new messages which are not generating a sufficient number of message responses are preferably re-transmitted to more client computers on the network 206, increasing a likelihood that the new message will yield a greater number of message responses. Preferably the second sub-set is greater than and does not overlap the first sub-set, however, how much greater the second sub-set is from the first sub-set can be based on any mathematical function (e.g. linear, exponential, etc.) In step 622, steps 616 through 620 are repeated with differing sub-sets of client computers, until either the predetermined minimum actual response count is met, or the new message has been re-transmitted to all members in the set of client computers on the network 206, after which the method 600 ends.

In step 624, if the new message's "actual response count" reaches the predetermined minimum actual response count or exceeds the predetermined minimum response count by a predetermined sufficient amount, after expiration of any of the waiting periods, the system module 234 deletes the new message from the messages file 236 and re-transmission of that new message ends. In this way, new messages which generate the sufficient amount of message responses are no longer re-transmitted over the network 206, conserving network resources as well as both sending and receiving client user's limited time.

Figure 7:
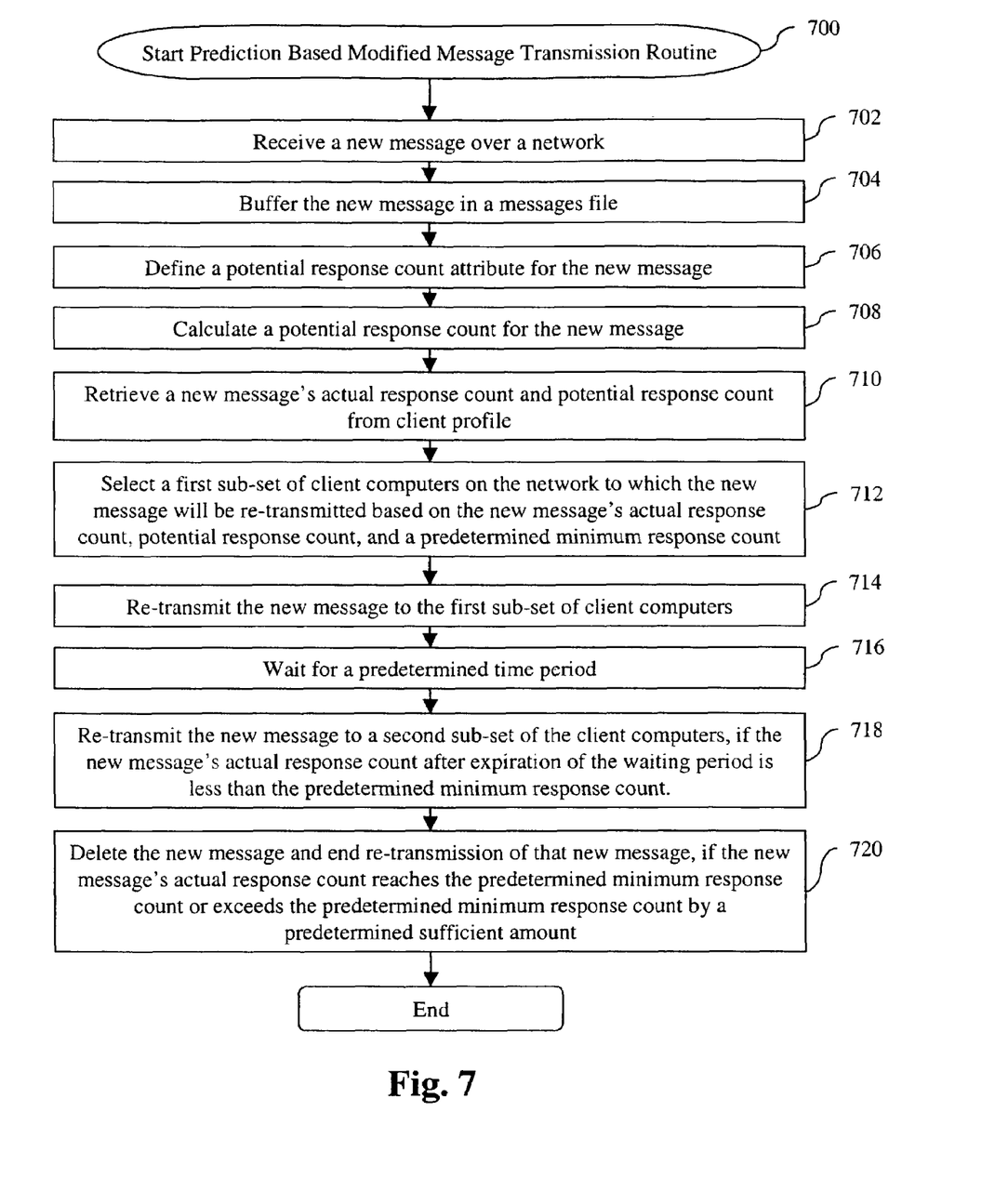
FIG. 7 is a flowchart of a method for modifying new message transmission based on potential message responses.

FIG. 7 is a flowchart of a method 700 for modifying "new message" transmission based on "potential message responses," which addresses the above concerns. The method 700 calculates a potential number of message responses, based on a similarity between new messages and a respective number of message responses thereto. In alternate embodiments of the present invention the client computer 202 may be replaced by a network server computer, such as either the central server 224 or a client computer which has sufficient processing and memory capacity.

The method 700 begins in step 702 where the client computer 202 receives a new message over the network 206, having a set of client computers. Next in step 704, the system module 234 buffers the new message in the messages file 236. In step 706, the system module 234 defines a potential response count attribute for each new message. In step 708 a potential response count is calculated for each of the new messages and stored in the client profile 210.

Those skilled in the art will know that many different formulas may be used to calculate the potential response count, however a preferred formula is calculated as follows. Given a new message ($m_{new}$), a total of n other new messages ($m_1, m_2, \ldots, m_n$) stored in the messages file 236, their respective message response counts ($rc_1, rc_2, \ldots, rc_n$) retrieved from the client profile 210, and a new message relatedness function (s( . . . )) for calculating how related $m_{new}$ is to ($m_1, m_2, \ldots, m_n$). A value of the new message relatedness function (s( . . . )) is generated, by first retrieving the profiles for the new messages and the message responses from the client profile 210 and then, determining how "related" each of the new message profiles are to each other, using techniques to be discussed below. New messages are herein defined as "related" if a "distance" between their new message expertise vectors is less than or equal to a predetermined distance. The value of the new message relatedness function (s( . . . )) is between zero and one. The system module 234 then calculates the potential response count (p) according to the following formula:

$$p = \frac{1}{n}\sum_i s(m_{new}, m_i) * rc_i$$

Thus the potential response count (p) is a weighted average of response counts between related new messages. Note that instead of the "summation" function in the equation above can also be replaced with a function selecting a "median" value.

Next in step 710, the system module 234 retrieves a new message's "actual response count" and "potential response count" from the client profile 210. In step 712, the system module selects a first sub-set of the set of client computers on the network 206 to which the new message will be re-transmitted based on the new message's actual response count, potential response count, a predetermined minimum response count, and predicted message response quality level.

For new messages with a large potential response count, or whose actual response count is close to the predetermined minimum response count, the first sub-set tends to be relatively smaller, since such new messages are likely to be answered quickly and/or by a large number of client users. For new messages with a small potential response count, or whose actual response count is not close to the predetermined minimum response count, the first sub-set tends to be relatively larger, since such new messages are unlikely to be answered quickly and/or by a large number of client users.

In step 714, the network module 216 re-transmits the new message to the first sub-set of the set of client computers on the network 206. In step 716, the system module 234 waits for a predetermined time period after the new message was re-transmitted by the network module 216. In step 718, if the new message's "actual response count" after expiration of the waiting period is less than the predetermined minimum response count, the network module 216 re-transmits the new message to a second sub-set of the of the set of client computers. Such a re-transmission to the second sub-set of client computers is unlikely to be necessary in most cases since the method 700 preferably predicted a low potential response count, and thus initially re-transmitted the new message to a much larger first sub-set of client computers.

In step 720, if the new message's "actual response count" reaches the predetermined minimum response count or exceeds the predetermined minimum response count by a predetermined sufficient amount, after expiration of any of the waiting periods, the system module 234 deletes the new message from the messages file 236 and re-transmission of that new message ends.

Message Scoring

For purpose of the discussion to follow, functionality within the client computer 202 for scoring received messages is discussed as if the client computer 202 was one of the receiving client computers. Such a context switch is appropriate because preferably each client computer contains a complete and self contained version of the present invention's software.

In step 310, the system module 234 within the receiving client computer 202 retrieves, and commands a scoring module 238 to score, newly received messages stored in the messages database 236. Messages are scored using a series of "rules" herein also labeled as "conditionals." These conditionals are preferably encoded as simple Java objects so that new conditionals can easily be added. Conditionals come in two main varieties, Quasi-Boolean and Fuzzy. Quasi-Boolean conditionals are used to generate a "filter score" and return a score of "1" if true or a small fractional score, such as "0.1," if false. Fuzzy conditionals return a decimal score anywhere between "1" and "0" and are used to generate a "statistical score." Scoring is performed by the scoring module 238 by comparing structured and unstructured data within a received message with structured and unstructured data stored in the receiving client's 204 client profile 210.

Filter Score

Sending clients may insert one or more optional filters into a message, which define "structured" data items and/or "keywords/key-phrases" which the sending client prefers the receiving client to meet, before the message is displayed to the receiving client. The scoring module 238 then attempts to match the optional filtering criteria to data within the client profile 210 of the receiving client. If a match is found, a filter score of "1" is assigned to that filtering criteria. If a match is not found, a "fractional filter score" is assigned to that filtering criteria. Those skilled in the art will recognize that other filter scoring techniques may also be used.

Statistical Score

While the filter score compares a receiving client's client profile 210 to a sending client's filtering criteria, the statistical score is in contrast a fuzzy conditional which compares the receiving client's client profile 210 to not only the sending client's filtering criteria and but also content within the received message.

Received messages are preferably scored using a predetermined set of statistical information retrieval techniques, such as linguistic analysis/scoring, known to those skilled in the art. Information retrieval techniques are commonly known to be used for accessing and analyzing large blocks of data and then extracting all or selected portions of such data according to a wide variety of methods.

To begin, the scoring module 238 extracts keywords and key-phrases from the received message. Then, the scoring module 238 generates an "expertise vector" for the received message. The expertise vector's magnitude equals a relative term frequency of each of the keywords and/or key-phrases within the message.

The scoring module 238 then generates an expertise vector, and magnitude thereof, for the receiving client's client profile 210 using the extracted keywords and/or key-phrases. The scoring module 238 primarily analyzes the receiving client's client profile 210 in order to calculate this expertise vector, however, the scoring module 238 may also analyze various files or caches stored on the recipient's client computer 202.

Then, the scoring module 238 generates the statistical message score by comparing the magnitude of the received message expertise vector with the magnitude of the receiving client's client profile expertise vector for each key-word and key-phrase. This statistical message score is equal to a "distance" between these two expertise vectors. Distance calculations between expertise vectors are well known in the art of linguistic analysis. Finally, the statistical score is normalized to between "0" and "1." Those skilled in the art will recognize that other statistical scoring techniques may also be used.

Overall Score

An overall score for the received message with respect to the receiving client is then calculated by combining the filter and the statistical scores. Those skilled in the art will recognize that there are many different ways to combine theses scores. Regardless of how the overall score is calculated, the overall score is meant to represent a percentage likelihood (on a 0% to 100% scale) that the receiving client will be able to respond to the received message with a correct and/or useful answer.

In a preferred embodiment, the scoring module 238 adds all of the filter scores, corresponding to the filtering criteria, and the statistical score. This total is divided by a total number of the filter and statistical scores in order to normalize the overall score to between "0" and "1." Then the scoring module 238 converts this normalized overall score to a percentage for display to the receiving client. For example, if the sending client has specified three filters within the filtering criteria, the three filters are given 75% of the overall score, and 25% of the overall score is based on the statistical score.

Thus the filtering and scoring methodologies presented, coupled with the private client profiles and the profile-richness that implies, allows client users to define "expertise" in a way which is uniquely personal to that client user.

Message Display and Response

In step 312, the received message is displayed to the receiving client preferably only if the message score exceeds a predetermined threshold. Messages are preferably displayed to the receiving client according to their respective score. As discussed above, the score represents a likelihood that the receiving client will find the message relevant to or within their expertise.

The receiving client then may select and respond to one of the messages. In step 314 a message response from the receiving client is sent over the network 206 back to the sending client anonymously or in an encrypted format. After step 314 the preferred method ends.

Processing Information from Other Sources Using The Present Invention

While the present invention has been discussed with respect to the generation, transmission and response to messages, the present inventions' scoring functionality is equally applicable toward processing other types of information as well. Other information includes data displayed within a current web page being viewed by the client user 204. A relevance vector could be generated from said web page data and compared to the client user's 204 expertise vector generated from the client profile 210. Client user's would be notified of a particular relevance of the currently viewed web page if the relevance and expertise vectors when compared yield a score which exceeds a predetermined threshold. In this way client user's browsing the web could be apprised of particular web pages which may closely align with their interests and/or expertise.

Other information similarly processed and scored may include: normal e-mail messages which have not been generated using the present inventions' functionality; files downloaded from the central server 224 or received from some other source; or expertise information stored on a central enterprise database. Those skilled in the art will know of other information sources to which the present invention may also be successfully applied.

While one or more embodiments of the present invention have been described, those skilled in the art will recognize that various modifications may be made. Variations upon and modifications to these embodiments are provided by the present invention, which is limited only by the following claims.

What is claimed is:

1. A method for knowledge management, comprising:
   generating a client profile on a client computer connected to a network;
   storing the profile on the computer;
   transmitting a new message;
   scoring, at the client computer, the new message with respect to the client profile;
   counting a number of message responses from client computers to the new message; and
   re-transmitting the new message to a first sub-set of client computers on the network, based on the response count.

2. The method of claim 1 wherein:
   the generating element includes generating the client profile on the client computer connected to a peer-to-peer network; and
   the re-transmitting element includes re-transmitting the new message on the peer-to-peer network.

3. The method of claim 1 wherein:
   new messages are any messages received by the client computer; and
   message responses are messages transmitted over the network responding to one or more new messages.

4. The method of claim 1, wherein the retransmitting element includes:
   delaying re-transmission of the new message to the first sub-set of client computers for a randomized period of time, if the score exceeds a predetermined threshold.

5. The method of claim 1, wherein the retransmitting element includes:
   generating proxy-profiles for a set of client computers on the network;
   scoring the new message with respect to the proxy profiles; and
   re-transmitting the new message to those client computers in the set of client computers which have proxy scores higher than a predetermined threshold.

6. The method of claim 1 wherein the counting element includes:
   associating an actual response count attribute with the new message;
   observing actual message responses over the network; and
   incrementing the actual response count attribute for the new message each time one of the actual message responses corresponds to the new message.

7. The method of claim 6, further including:
   waiting for a predetermined time period;
   retrieving the actual response count after the predetermined time period; and
   re-transmitting the new message to a second sub-set of client computers on the network, if the actual response count remains less than a predetermined minimum response count.

8. The method of claim 7:
   wherein the second sub-set does not overlap the first sub-set.

9. The method of claim 7 further comprising:
   repeating the waiting and re-transmitting elements with differing sub-sets of client computers on the network, until the actual response count reaches the predetermined minimum response count.

10. The method of claim 7 further comprising:
    repeating the waiting and re-transmitting elements with differing sub-sets of client computers, until the new message has been re-transmitted to all of the client computers on the network.

11. The method of claim 6 wherein the re-transmitting element includes:
    reducing a number of client computers in the first sub-set, if a predetermined minimum response count minus the actual response count is less than a first predetermined number; and
    increasing the number of client computers in the first sub-set, if the predetermined minimum response count minus the actual response count is greater than a second predetermined number.

12. The method of claim 1:
    wherein the counting element includes:
       associating a potential response count attribute with the new message;
       profiling the new message;
       profiling the message responses; and
       defining the potential response count for the new message based on a relatedness between the new message, a set of other new messages, and each of their respective actual response counts; and
    wherein the re-transmitting element includes,
       selecting the first sub-set of client computers based on the potential response count.

13. The method of claim 12 wherein the defining element includes;
    calculating a "new message relatedness" between the new message and each new message within the set of other new messages;
    retrieving the actual response counts for the other new messages; and
    defining the potential response count as an average of the actual response counts respectively weighted by the "new message relatedness" of each of the other new messages.

14. The method of claim 13:
    wherein the calculating element includes defining the "new message relatedness" as a distance between an expertise vector of the new message and an expertise vector of one of the other new messages.

15. The method of claim 12 wherein the defining element includes:
    associating a potential response count (p) attribute with the new message;
    profiling the new message;
    profiling the message responses;
    logically assigning a new message variable ($m_{new}$) to the new message;
    logically assigning new message variables ($m_1, m_2, \ldots, m_n$) respectively to a set of (n) other new messages;
    calculating a "new message relatedness" ($s(\ldots)$) between the new message ($m_{new}$) and each new message within a set of other new messages ($m_1, m_2, \ldots, m_n$);
    retrieving actual response counts ($rc_1, rc_2, \ldots, rc_n$) respectively corresponding to the other new messages; and defining the potential response count (p) as equal to: $s(m_{new}, m_i) * rc_i$ $$p = \frac{1}{n} \sum_i s(m_{new}, m_i) * rc_i.$$

16. The method of claim 12 wherein the defining element includes:
associating a potential response count (p) attribute with the new message;
profiling the new message;
profiling the message responses;
logically assigning a new message variable ($m_{new}$) to the new message;
logically assigning new message variables ($m_1, m_2, \ldots, m_n$) respectively to a set of (n) other new messages;
calculating a "new message relatedness" (s( . . . )) between the new message ($m_{new}$) and each new message within a set of other new messages ($m_1, m_2, \ldots, m_n$);
retrieving actual response counts ($rc_1, rc_2, \ldots, rc_n$) respectively corresponding to the other new messages; and
defining the potential response count (p) as equal to:

$$p = \frac{1}{n} \text{Median } (s(m_{new}, m_i) * rc_i).$$

17. The method of claim 12, wherein tho selecting element includes:
defining the first sub-set as less than a predetermined number of client computers, if the potential response count is greater than a predetermined response count; and
defining the first sub-set as greater than the predetermined number of client computers, if the potential response count is less than the predetermined response count.

18. The method of claim 12, wherein the selecting element includes:
calculating a predicted message response quality level for the new message;
reducing a number of client computers in the first sub-set, if the predicted message response quality level is greater than a first predetermined quality level; and
increasing a number of client computers in the first sub-set, if the predicted message response quality level is less than the first predetermined quality level.

19. The method of claim 18, wherein:
the calculating a predicted message response quality level element includes, calculating a message response relatedness between each new message, within the set of other new messages, and corresponding message responses; and
the defining the potential response count includes, weighting the potential response count with the message response relatedness.

20. The method of claim 1, further comprising:
configuring the client computer as a server computer on the network.

21. The method of claim 20:
further comprising, requiring sending client computers to send only one copy of the new message to the server computer; and wherein the re-transmitting element includes, selectively permitting client computers to pick-up new messages from the server.

22. A system for knowledge management, comprising:
means for generating a client profile on a client computer connected to a network;
means for storing the profile on the computer;
means for transmitting a new message;
means for scoring, at the client computer, the new message with respect to the client profile;
means for counting a number of message responses from client computers to the new message; and
means for re-transmitting the new message to a first sub-set of client computers on the network, based on the response count.

23. The system of claim 22, further comprising:
means for waiting for a predetermined time period;
means for retrieving an actual response count after the predetermined time period; and
means for re-transmitting the new message to a second sub-set of client computers on the network, if the actual response count remains less than a predetermined minimum response count.

24. The system of claim 22, further comprising:
means for configuring the client computer as a server computer on the network.

25. A method of software execution for knowledge management, comprising:
generating client profiles on client computers connected to a network;
storing the client profiles at the client computers;
transmitting a new message to a plurality of the client computers;
counting a number of responses made by the client computers to the new message; and
re-transmitting, based on the number of responses, the new message to a plurality of the client computers.

26. The method of claim 25 further comprising, waiting until expiration of a predetermined time period before re-transmitting the new message.

27. The method of claim 25 further comprising, deleting the new message from a plurality of the client computers once the number of responses reaches a predetermined number.

28. A method of software execution for knowledge management, comprising:
scoring a new message at a plurality of client computers;
if a score at a first client computer exceeds a threshold, then providing a client at the first client computer a time period to generate a response to the new message;
if the client at the first client computer does not generate the response within the time period, then automatically transmitting the new message from the first client computer to a first sub-set of the client computers;
counting a number of responses made by the client computers to the new message; and
re-transmitting the new message from the first client computer to a second sub-set of the client computers.

29. The method of claim 28, wherein the second sub-set is greater than and does not overlap the fist sub-set.

30. The method of claim 28 further comprising, if the number of responses exceeds a threshold, then ending re-transmission of the new message.

* * * * *

UNITED STATES PATENT AND TRADEMARK OFFICE
CERTIFICATE OF CORRECTION

PATENT NO. : 7,246,121 B2
APPLICATION NO. : 10/262717
DATED : July 17, 2007
INVENTOR(S) : Eytan Adar et al.

It is certified that error appears in the above-identified patent and that said Letters Patent is hereby corrected as shown below:

In column 14, line 35, in Claim 13, delete "includes;" and insert -- includes: --, therefor.

In column 15, line 32, in Claim 17, after "wherein" delete "tho" and insert -- the --, therefor.

In column 16, line 62, in Claim 29, delete "fist" and insert -- first --, therefor.

Signed and Sealed this

First Day of September, 2009

David J. Kappos
*Director of the United States Patent and Trademark Office*